US008111697B1

(12) United States Patent
Panwar et al.

(10) Patent No.: US 8,111,697 B1
(45) Date of Patent: Feb. 7, 2012

(54) METHODS AND APPARATUS FOR PACKET CLASSIFICATION BASED ON MULTIPLE CONDITIONS

(75) Inventors: Ramesh Panwar, Pleasanton, CA (US);
Deepak Goel, Sunnyvale, CA (US);
Jianhui Huang, Fremont, CA (US);
Srinivasan Jagannadhan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 63 days.

(21) Appl. No.: 12/347,495

(22) Filed: Dec. 31, 2008

(51) Int. Cl.
*H04L 12/28* (2006.01)
(52) U.S. Cl. .......................... 370/392; 370/389; 726/13
(58) Field of Classification Search .................. 370/392, 370/395.32, 395.21, 235, 401, 254, 389, 370/351
See application file for complete search history.

(56) References Cited

U.S. PATENT DOCUMENTS

| 4,215,402 | A  | 7/1980  | Mitchell et al. |
| 5,463,777 | A  | 10/1995 | Bialkowski et al. |
| 5,473,607 | A  | 12/1995 | Hausman et al. |
| 5,495,476 | A  | 2/1996  | Kumar |
| 5,987,028 | A  | 11/1999 | Yang et al. |
| 6,073,160 | A  | 6/2000  | Grantham et al. |
| 6,157,955 | A  | 12/2000 | Narad et al. |
| 6,212,184 | B1 | 4/2001  | Venkatachary et al. |
| 6,226,629 | B1 | 5/2001  | Cossock |
| 6,266,705 | B1 | 7/2001  | Ullum et al. |
| 6,457,058 | B1 | 9/2002  | Ullum et al. |
| 6,587,466 | B1 | 7/2003  | Bhattacharya et al. |
| 6,600,741 | B1 | 7/2003  | Chrin et al. |
| 6,600,744 | B1 | 7/2003  | Carr et al. |
| 6,614,789 | B1 | 9/2003  | Yazdani et al. |
| 6,618,397 | B1 | 9/2003  | Huang |
| 6,654,373 | B1 | 11/2003 | Maher, III et al. |
| 6,658,482 | B1 | 12/2003 | Chen et al. |
| 6,665,274 | B1 | 12/2003 | Yamada |
| 6,675,163 | B1 | 1/2004  | Bass et al. |
| 6,721,316 | B1 | 4/2004  | Epps et al. |
| 6,731,631 | B1 | 5/2004  | Chang et al. |
| 6,731,644 | B1 | 5/2004  | Epps et al. |
| 6,735,670 | B1 | 5/2004  | Bronstein et al. |
| 6,754,662 | B1 | 6/2004  | Li |
| 6,778,532 | B1 | 8/2004  | Akahane et al. |
| 6,778,546 | B1 | 8/2004  | Epps et al. |
| 6,778,984 | B1 | 8/2004  | Lu et al. |
| 6,789,118 | B1 | 9/2004  | Rao |
| 6,813,243 | B1 | 11/2004 | Epps et al. |
| 6,859,455 | B1 | 2/2005  | Yazdani et al. |
| 6,862,278 | B1 | 3/2005  | Chang et al. |

(Continued)

OTHER PUBLICATIONS

H. Jonathan Chao et al. "Matching Algorithms for Three-Stage Bufferless Clos Network Switches" IEEE Communications Magazine, Oct. 2003, pp. 46-54.

(Continued)

*Primary Examiner* — Michael J Moore, Jr.
(74) *Attorney, Agent, or Firm* — Cooley LLP

(57) ABSTRACT

In one embodiment, a method includes classifying a data packet received at a switch fabric, selecting an action descriptor in response to the classifying, and processing an action defined in the action descriptor. The classifying is based on a primary classification condition and first portion of the data packet. The action descriptor is associated with the primary classification condition. The processing includes determining whether a secondary classification condition is satisfied by a second portion of the data packet.

12 Claims, 8 Drawing Sheets

U.S. PATENT DOCUMENTS

| | | | |
|---|---|---|---|
| 6,889,225 B2 | 5/2005 | Cheng et al. | |
| 6,917,946 B2 | 7/2005 | Corl, Jr. et al. | |
| 6,925,085 B1 | 8/2005 | Krishna et al. | |
| 6,940,862 B2 | 9/2005 | Goudreau | |
| 6,947,931 B1 | 9/2005 | Bass et al. | |
| 6,977,930 B1 | 12/2005 | Epps et al. | |
| 7,042,878 B2 | 5/2006 | Li | |
| 7,089,240 B2 | 8/2006 | Basso et al. | |
| 7,133,400 B1* | 11/2006 | Henderson et al. | 370/389 |
| 7,136,926 B1 | 11/2006 | Iyer et al. | |
| 7,173,931 B2 | 2/2007 | Chao et al. | |
| 7,190,696 B1 | 3/2007 | Manur et al. | |
| 7,193,997 B2 | 3/2007 | Van Lunteren et al. | |
| 7,227,842 B1 | 6/2007 | Ji et al. | |
| 7,233,568 B2 | 6/2007 | Goodman et al. | |
| 7,233,579 B1 | 6/2007 | Crump et al. | |
| 7,277,429 B2 | 10/2007 | Norman et al. | |
| 7,304,992 B2* | 12/2007 | Relan | 370/392 |
| 7,317,723 B1* | 1/2008 | Guru | 370/392 |
| 7,325,074 B2 | 1/2008 | McRae | |
| 7,349,415 B2 | 3/2008 | Rangarajan et al. | |
| 7,356,033 B2 | 4/2008 | Basu et al. | |
| 7,369,561 B2 | 5/2008 | Wybenga et al. | |
| 7,373,345 B2 | 5/2008 | Carpentier et al. | |
| 7,382,637 B1 | 6/2008 | Rathnavelu et al. | |
| 7,382,777 B2 | 6/2008 | Irish et al. | |
| 7,382,876 B2 | 6/2008 | Lauter et al. | |
| 7,383,244 B2 | 6/2008 | Bass et al. | |
| 7,403,524 B2 | 7/2008 | Hill | |
| 7,403,526 B1 | 7/2008 | Zou et al. | |
| 7,403,999 B2* | 7/2008 | Corl et al. | 709/230 |
| 7,418,505 B2 | 8/2008 | Lim et al. | |
| 7,424,744 B1* | 9/2008 | Wu et al. | 726/23 |
| 7,441,268 B2 | 10/2008 | Remedios | |
| 7,480,302 B2 | 1/2009 | Choi | |
| 7,525,958 B2* | 4/2009 | Kumar et al. | 370/386 |
| 7,543,052 B1 | 6/2009 | Cesa Klein | |
| 7,602,787 B2 | 10/2009 | Cheriton | |
| 7,610,330 B1 | 10/2009 | Quinn et al. | |
| 7,646,771 B2 | 1/2010 | Guru et al. | |
| 7,668,160 B2* | 2/2010 | Narayan et al. | 370/389 |
| 7,738,454 B1 | 6/2010 | Panwar et al. | |
| 7,796,541 B1 | 9/2010 | Goel et al. | |
| 7,835,357 B2* | 11/2010 | Panwar et al. | 370/389 |
| 7,889,741 B1* | 2/2011 | Panwar et al. | 370/392 |
| 7,961,734 B2* | 6/2011 | Panwar et al. | 370/392 |
| 2002/0138648 A1 | 9/2002 | Liu | |
| 2002/0152209 A1 | 10/2002 | Merugu et al. | |
| 2002/0191605 A1 | 12/2002 | Lunteren et al. | |
| 2003/0023846 A1 | 1/2003 | Krishna et al. | |
| 2003/0030575 A1 | 2/2003 | Frachtenberg et al. | |
| 2003/0053460 A1 | 3/2003 | Suda et al. | |
| 2003/0059045 A1 | 3/2003 | Ruehle | |
| 2003/0156586 A1* | 8/2003 | Lee et al. | 370/392 |
| 2003/0219017 A1 | 11/2003 | Davis et al. | |
| 2003/0223424 A1 | 12/2003 | Anderson et al. | |
| 2003/0233516 A1 | 12/2003 | Davis et al. | |
| 2004/0015599 A1 | 1/2004 | Trinh et al. | |
| 2004/0028046 A1 | 2/2004 | Govindarajan et al. | |
| 2004/0095936 A1 | 5/2004 | O'Neill et al. | |
| 2004/0100959 A1 | 5/2004 | Relan | |
| 2004/0105422 A1 | 6/2004 | Sahni et al. | |
| 2004/0190526 A1* | 9/2004 | Kumar et al. | 370/395.21 |
| 2004/0254909 A1 | 12/2004 | Testa | |
| 2004/0264373 A1 | 12/2004 | Engbersen et al. | |
| 2005/0083935 A1 | 4/2005 | Kounavis et al. | |
| 2005/0141510 A1 | 6/2005 | Narsinh et al. | |
| 2005/0146449 A1 | 7/2005 | Adl-Tabatabai et al. | |
| 2005/0226235 A1 | 10/2005 | Kumar et al. | |
| 2005/0232261 A1 | 10/2005 | Wybenga et al. | |
| 2005/0237938 A1 | 10/2005 | Corl, Jr. et al. | |
| 2006/0050690 A1 | 3/2006 | Epps et al. | |
| 2006/0083247 A1 | 4/2006 | Mehta | |
| 2006/0195896 A1 | 8/2006 | Fulp et al. | |
| 2006/0218167 A1 | 9/2006 | Bosley et al. | |
| 2006/0221956 A1 | 10/2006 | Narayan et al. | |
| 2006/0221967 A1 | 10/2006 | Narayan et al. | |
| 2007/0008962 A1 | 1/2007 | Basu et al. | |
| 2007/0070900 A1 | 3/2007 | Heink et al. | |
| 2007/0071233 A1 | 3/2007 | Zak | |
| 2007/0115986 A1 | 5/2007 | Shankara | |
| 2007/0133593 A1 | 6/2007 | Shankara | |
| 2007/0234005 A1 | 10/2007 | Erlingsson et al. | |
| 2007/0283045 A1 | 12/2007 | Nguyen et al. | |
| 2008/0052300 A1 | 2/2008 | Horgan | |
| 2008/0162698 A1 | 7/2008 | Hopen et al. | |
| 2008/0177812 A1 | 7/2008 | Brandle | |
| 2008/0186974 A1 | 8/2008 | Singh et al. | |
| 2008/0205403 A1* | 8/2008 | Akyol et al. | 370/392 |
| 2008/0205405 A1* | 8/2008 | Corl et al. | 370/392 |
| 2008/0212586 A1* | 9/2008 | Wang et al. | 370/392 |
| 2008/0228798 A1 | 9/2008 | Van Lunteren | |
| 2009/0196297 A1 | 8/2009 | Jabr | |
| 2010/0040067 A1* | 2/2010 | Hao et al. | 370/395.32 |
| 2010/0080224 A1 | 4/2010 | Panwar et al. | |
| 2010/0083345 A1 | 4/2010 | Panwar et al. | |

OTHER PUBLICATIONS

Itamar Elhanany et al. "High-performance Packet Switching Architectures" Springer Science & Business Media, ISBN-10: 184628273X, 2002, Chapter 10, 20 pages.

Office Action mailed Feb. 17, 2010 for U.S. Appl. No. 12/242,168 (12 pages).

Office Action mailed May 10, 2010 for U.S. Appl. No. 12/242,143 (23 pages).

Office Action mailed Feb. 16, 2010 for U.S. Appl. No. 12/242,172 (11 pages).

Office Action mailed Jun. 10, 2010 for U.S. Appl. No. 12/242,278, filed Sep. 30, 2008 (24 pages).

U.S. Appl. No. 12/242,143, filed Sep. 30, 2008, entitled "Methods and Apparatus for Compression in Packet Classification" (34 pgs).

U.S. Appl. No. 12/242,125, filed Sep. 30, 2008, entitled "Methods and Apparatus for Range Matching During Packet Classification Based on a Linked-Node Structure" (39 pgs).

U.S. Appl. No. 12/242,278, filed Sep. 30, 2008, entitled "Methods and Apparatus to Implement Except Condition During Data Packet Classification" (35 pgs).

U.S. Appl. No. 12/794,175, filed Jun. 4, 2010 entitled "Methods and Apparatus Related to Packet Classification Based on Range Values" (42 pgs).

U.S. Appl. No. 12/242,158, filed Sep. 30, 2008 entitled "Methods and Apparatus for Producing a Hash Value Based on a Hash Function" (37 pgs).

U.S. Appl. No. 12/347,499, filed Dec. 31, 2008 entitled "Methods and Apparatus for Packet Classification Based on Multiple Conditions" (41 pgs).

U.S. Appl. No. 12/347,418, filed Dec. 31, 2008 entitled "Methods and Apparatus for Indexing Set Bit Values in a Long Vector Associated with a Switch Fabric" (35 pgs).

Office Action mailed Sep. 2, 2010 for U.S. Appl. No. 12/242,168 (5 pages).

U.S. Appl. No. 12/874,681, filed Sep. 2, 2010 entitled "Methods and Apparatus for Range Matching During Packet Classification Based on a Linked-Node Structure" (42 pgs).

Final Office Action mailed Dec. 17, 2010 for U.S. Appl. No. 12/242,143 (29 pgs).

Office Action mailed Nov. 8, 2010 for U.S. Appl. No. 12/242,278, filed Sep. 30, 2008 (26 pgs).

Office Action mailed May 24, 2011 for U.S. Appl. No. 12/874,681, filed Sep. 2, 2010 (7 pgs).

* cited by examiner

Key Vector

| Key 1 | Key 2 | ... | Key N |

Fig. 8

Action Descriptor

| Action 1 | Action 2 | ... | Action N |

Fig. 9

Condition Test Vector

| Condition Test 1 | | | Condition Test 2 | | | ... | Condition Test N | | |
|---|---|---|---|---|---|---|---|---|---|
| Key Selector | Relation Selector | Condition Value | Key Selector | Relation Selector | Condition Value | | Key Selector | Relation Selector | Condition Value |

Fig. 10

METHODS AND APPARATUS FOR PACKET CLASSIFICATION BASED ON MULTIPLE CONDITIONS

RELATED APPLICATION

This application is related to U.S. patent application Ser. No. 12/347,499, now U.S. Pat. No. 7,889,741, filed on Dec. 31, 2008, and entitled, "Methods and Apparatus for Packet Classification Based on Multiple Conditions," which is incorporated herein by reference in its entirety.

BACKGROUND

Some embodiments relate generally to methods and apparatus for packet classification including, for example, packet classification using multiple classification conditions. For example, some embodiments relate to packet classification in which one condition that is satisfied during the classification triggers or initiates additional (or secondary) conditions.

Known methods of packet classification include algorithmic solutions. Algorithmic solutions typically rely on a database of fields of a data packet (or portions of a data packet) that are used in a policy to classify a data packet. Often the database is implemented in random access memory ("RAM") such as dynamic random access memory ("DRAM").

Additionally, known solutions represent a policy as a cross-product of the fields used in the policy to classify data packets. In other words, the fields in a policy are expanded such that each value of a field in a data packet that can satisfy a condition is represented in memory, and each condition in the policy is evaluated by determining whether the data packet has value and corresponds to one of the values represented in the memory. Thus, known solutions rely on large amounts of memory and this can greatly increase the cost and the size of hardware used to represent the policy. In algorithmic solutions, this typically precludes inclusion of storing the database in DRAM on a single chip with a processor. Because the database is stored off-chip from the processor, memory access latency and time increase, reducing performance.

SUMMARY OF THE INVENTION

In one embodiment, a method includes classifying a data packet received at a switch fabric, selecting an action descriptor in response to the classifying, and processing an action defined in the action descriptor. The classifying is based on a primary classification condition and first portion of the data packet. The action descriptor is associated with the primary classification condition. The processing includes determining whether a secondary classification condition is satisfied by a second portion of the data packet.

BRIEF DESCRIPTION OF THE DRAWINGS

FIG. 8 is an illustration of a key vector, according to an embodiment.

FIG. 9 is an illustration of an action descriptor, according to an embodiment.

FIG. 10 is an illustration of a condition test vector, according to an embodiment.

DETAILED DESCRIPTION

Figure 1:
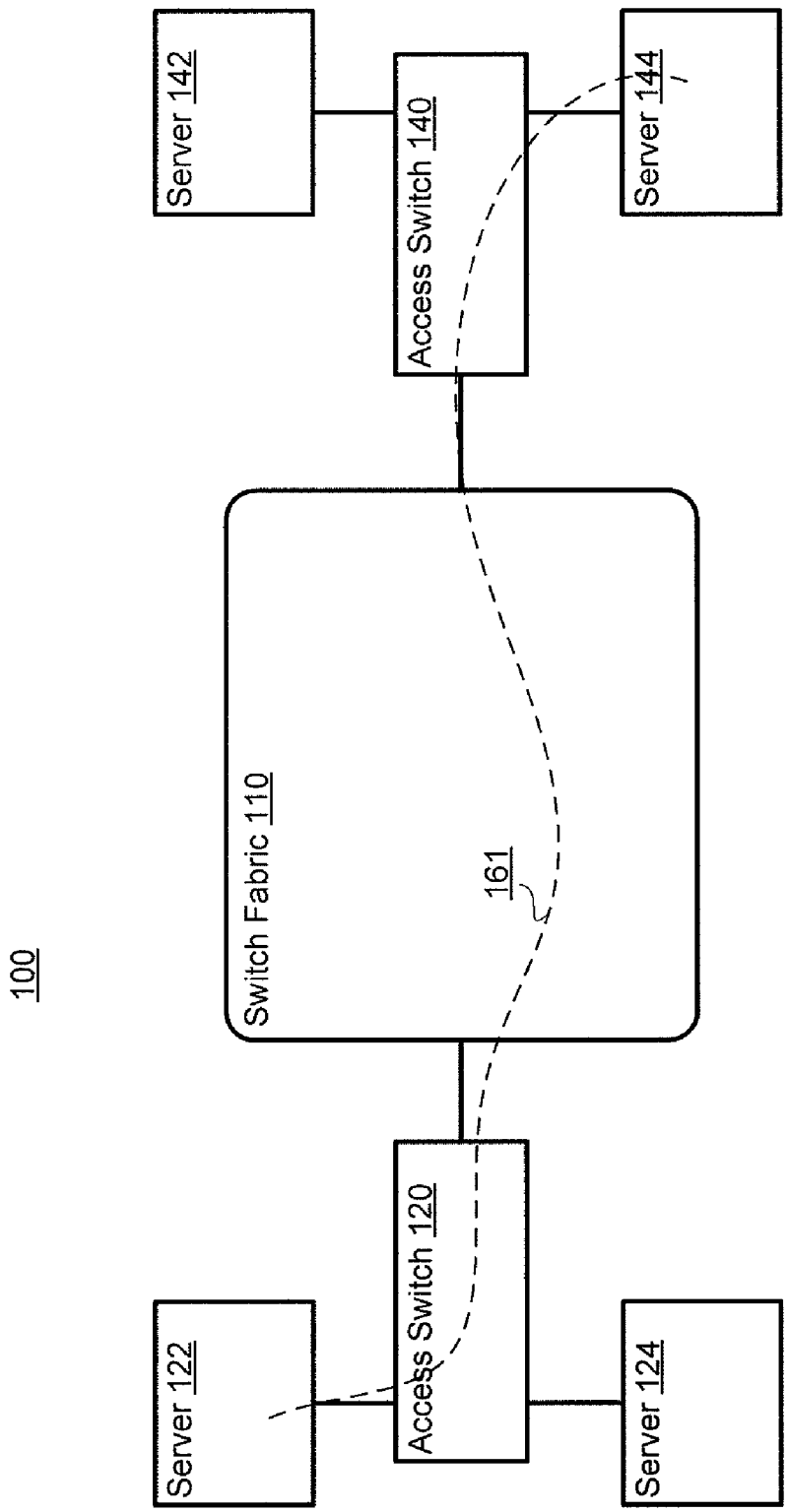
FIG. 1 is a system block diagram of a data center network, according to an embodiment.

A packet classification module at an access switch connected to a multi-stage switch fabric can be configured to classify a data packet (e.g., an Internet Protocol (IP) packet, a session control protocol packet, a media packet) received at the access switch from a device such as a server. Classifying can include any processing performed so that the data packet can be processed at the access switch based on a policy. In some embodiments, the policy can include one or more policy conditions that are associated with an action (or instruction) that can be executed at the access switch. The policy can be, for example, a policy to route a data packet to a particular destination if the data packet has a specified type of network address (policy condition). Packet classification can include determining whether the policy condition has been satisfied so that the action can be executed. For example, one or more portions (e.g., a field, a payload, an address portion, a port portion) of the data packet can be analyzed by the packet classification module based on a policy condition defined within a policy. When the policy condition is satisfied, the data packet can be processed based on an action associated with the policy condition.

In some embodiments, an action can trigger execution of additional policy conditions. For example, a data packet can be classified based on a condition satisfied by the longest prefix match of a source address of the data packet. An action associated with that condition can define another condition for further classifying the data packet. For example, an action can define a condition to further classify the data packet based on a flag value in the data packet.

Evaluating conditions separately or in a dependent manner can have many advantages because various types of conditions are possible during packet classification. For example, some conditions are most efficiently implemented using simple matching (e.g., a condition to determine whether a field in a data packet matches a predefined value). Other conditions are not most efficiently represented as simple match conditions. For example, some conditions specify a range of values. The match of the condition (e.g., a value that satisfies the condition) is satisfied when a value is within the range of values. Although it is possible to determine whether a value (e.g., portion of a data packet) is a match for the condition by storing each value in the range of values in a memory and then determining whether that value is represented in the memory (e.g., using a simple match), a significant amount of memory and semiconductor area is used in such an approach. A condition with a range can be more efficiently evaluated or implemented by other methods such as methods using linked-node structures. Additionally, determining a longest prefix match to a field in a data packet can be implemented using a simple match, but can be more efficiently implemented using a hash function. Thus, by evaluating different conditions using the techniques that are efficient for each type of condition can increase classification speed and reduce resource (e.g., memory) requirements.

Furthermore, the number of operations in a packet classification module that are executed to determine that a data packet does not satisfy a condition is reduced by first classifying a data packet using a first condition that only a few data packets satisfy. If the data packet does not satisfy the condition, then classification can be complete. If the data packet satisfies the condition, then the data packet can be further classified using a second condition that is satisfied by many packets. If the order of the conditions is reversed (i.e., first classify with the second condition, and classify with the first condition if the second condition is satisfied), operations related to both classifications will be executed more frequently because the second condition is frequently satisfied.

For example, in a data center network a condition can specify two parameters: a destination address (associated with a single device in the data center network) and a virtual local area network ("VLAN") tag (associated with many frequently-accessed devices in the data center network). If both parameters are tested concurrently to classify a data packet, then an operation for each parameter will be executed for each data packet classified. If the VLAN tag element is used to first classify the data packet, the destination address parameter will frequently be executed because many data packets will likely satisfy the VLAN tag element. Thus, an operation for each parameter will frequently be executed. If the destination address parameter is used first to classify the data packet, the VLAN tag parameter will rarely be used because a relatively small number of data packets include the destination address. Thus, only one operation will frequently be executed, and occasionally two operations will be executed. Accordingly, power consumption and heat generation can be reduced when the result of packet classification based on one condition is used to trigger packet classification based on another condition.

In some embodiments, a data packet can be associated with a policy vector that can include one or more bit values that represent whether or not a policy condition associated with a policy has been satisfied based on processing of a portion of the data packet. The policy vector can be used to trigger processing of the data packet, or additional classification of the data packet, at the access switch based on an instruction associated with the policy (when the bit value(s) indicate that the policy condition has been satisfied). Thus, a bit value in a policy vector can trigger or initiate additional classification of a data packet. In some embodiments, a policy vector can be referred to as a facet cover vector.

The packet classification module (including any sub-modules and/or memory) can be implemented in hardware. For example, sub-modules of the packet classification module that are configured to process the data packet based on one or more policy conditions associated with a policy can be implemented in hardware. In addition, modules that are configured to execute an instruction associated with a policy can be implemented in hardware and can be included in a packet classification module. In some embodiments, the packet classification module (including sub-modules and memory) can be integrated on a single (or common) semiconductor chip. In some embodiments, one or more portions of the packet classification module can be implemented in software (executing on a processor), or implemented in a combination of hardware and software.

In some embodiments, the process of classifying a data packet can be referred to as classification. In some embodiments, a portion of an access switch can be configured to trigger another portion of the access switch to execute an action (or instruction) associated with a policy. In some embodiments, an access switch can be configured to trigger, based on a policy vector, execution of an instruction at a separate entity. In some embodiments, a data packet can be processed based on a policy that is associated with a group of data packets. In some embodiments, the group of data packets can be referred to as a data packet flow or as a flow.

In some embodiments, a vector, such as the policy vector, can be a binary string defined by, for example, a sequence of high values (represented as 1's) and/or low values (represented as 0's). The values in the binary string can be referred to as bit values. In other words, the vector can define a sequence of bit values. In some embodiments, for example, if a packet classification module is implemented in a hardware system that is a base-n system (e.g., a base-4 system), a vector processed by the packet classification module can be a base-n string. In some embodiments, the vector can be defined as a one-dimensional array. In some embodiments, for example, if a packet classification module is implemented in software, a vector processed by the packet classification module can be a string that includes a sequence of symbols (e.g., American Standard Code for Information Interchange (ASCII) characters) and/or digits. For example, the vector can be a byte string or a hexadecimal value.

FIG. 1 is a system block diagram of network 100 including a switch fabric, according to an embodiment. As illustrated in FIG. 1, network 100 includes switch fabric 110, access switch 120, access switch 140, server 122, server 124, server 142, and server 144. Switch fabric 110 is operatively coupled to access switch 120 and access switch 140. Server 122 and server 124 are operatively coupled to switch fabric 110 via access switch 120. Server 142 and server 144 are operatively coupled to switch fabric 110 via access switch 140.

Network 100 is configured such that servers 122, 124, 142, and 144 can communicate one with another via access switch 120, access switch 140 and switch fabric 110. For example, as illustrated by data path 161, server 122 can send a data packet addressed to server 144 to access switch 120. Access switch 120 can forward the data packet to access switch 140 via switch fabric 110. Access switch 140 can then forward the data packet to server 144. In some embodiments, access switches 120 and access switch 140 are configured to classify data packets received from servers 122 and 124, and servers 142 and 144, respectively.

In some embodiments, servers 122 and 124, servers 142 and 144 communicate with access switches 120 and 140, respectively, via one protocol and access switches 120 and 140 can communicate with switch fabric 110 via another protocol. For example, servers 122 and 124, and 142 and 144 can communicate with access switches 120 and 140, respectively, via an Ethernet protocol and access switches 120 and 140 communicate with switch fabric 110 via a cell-based switching protocol (e.g., using fixed-length or variable-length cell switching). In other words, in some embodiments access switches 120 and 140 can operate as gateways between servers and/or other devices communicating via one protocol in a network and with switch fabric 110 communicating via another protocol.

In some embodiments, access switches 120 and 140 are configured to classify data packets received by server 122 and 124, and servers 142 and 144, respectively, before forwarding the data packets to determine whether any processing is appropriate for the data packets. For example, access switches 120 and 140 can include a packet classification module configured to classify data packets received by access switches 120 and 140. In some embodiments, data packet classification can include determining whether a portion of a data packet satisfies a condition included in a policy such as, for example, a firewall policy, a routing policy, and/or an access control list ("ACL"). In some embodiments, a processing action (also referred to herein as an action) can be related to condition in the policy, and access switches 120 and 140 are configured to execute (or perform) that action if the related condition is satisfied by the condition during packet classification. Actions can include, for example, modifying one or more parameters of a data packet, accessing a database (not shown) to determine routing information related to a data packet and/or destination of a data packet, dropping a packet, and/or other actions relative to the data packet.

In some embodiments, multiple actions can be related to a single condition. For example, if a condition is satisfied, access switch 120 can modify a time-to-live ("TTL") value in a data packet received from server 122 and accessing a database to determine routing information related to or associated with the data packet. In some embodiments, an action can be dependent on another action defining a condition. Said differently, an action can be executed in response to a condition satisfied by a data packet during packet classification, and that action can define a secondary (or supplemental) classification condition. If the secondary classification condition is satisfied, another action is executed. For example, a data packet received by access switch 140 from server 144 can be classified based on a condition (referred to as a primary classification condition, or primary condition) defining a longest prefix match of a destination Internet Protocol ("IP") address of the packet. Access switch 140 can execute an action triggered by the primary condition where that action defines an additional, supplemental, or secondary classification condition (or secondary condition) such as a match of Transmission Control Protocol ("TCP") flags in the data packet. Access switch 140 can further classify the data packet based on that secondary condition. In other words, if the TCP flags in the data packet satisfy the secondary condition defined in the action, access switch 140 can execute another action relative to the data packet. Thus, the result or outcome of packet classification with a primary classification condition can invoke or trigger packet classification with a secondary classification condition.

Figure 2:
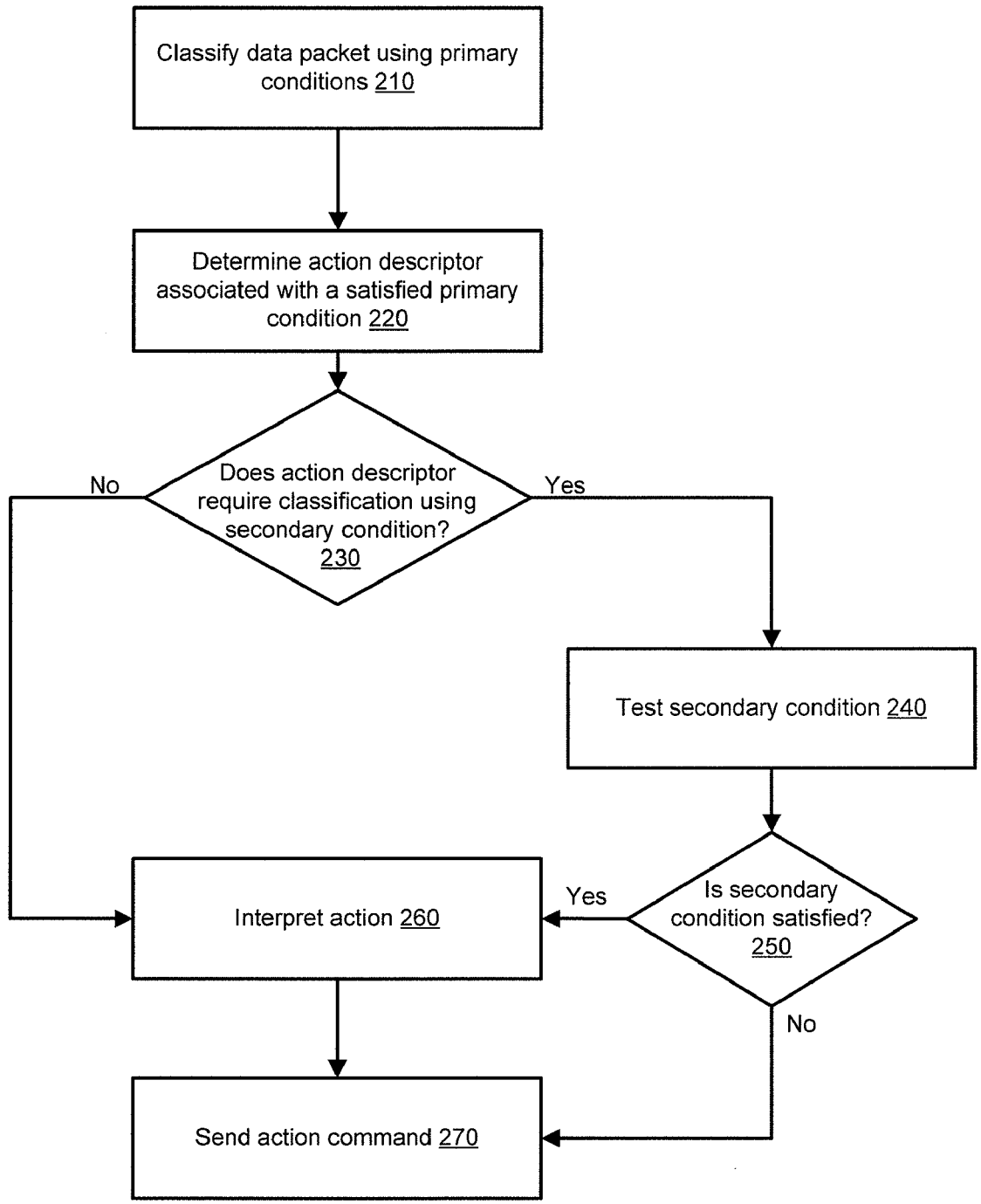
FIG. 2 is a block diagram of a process for classifying a data packet within a switch fabric network, according to an embodiment.

FIG. 2 is a block diagram of a process of executing an action in a network including a switch fabric, according to an embodiment. A data packet such as, for example, a data packet received from a server by an access switch is classified based on one or more primary conditions, at 210. In some embodiments, primary conditions include longest prefix matches or conditions, best-fit range matches or conditions, a combination of longest prefix matches or conditions and best range matches or conditions, and/or other conditions. In some embodiments, an access switch includes specialized hardware modules and/or algorithms to test or evaluate primary conditions. In some embodiments, such specialized algorithms and hardware modules are application specific and particularly useful for evaluating a single type or class of primary conditions. For example, an access switch can include specialized hardware modules configured to perform longest prefix matching, and other specialized hardware module configured to perform best-fit range matches. More details related to packet classification, longest prefix matching, and best range matching are set forth in co-pending patent applications U.S. patent application Ser. No. 12/242,143, filed on Sep. 30, 2008, and entitled "Methods and Apparatus for Compression in Packet Classification;" U.S. patent application Ser. No. 12/242,125, filed on Sep. 30, 2008, and entitled "Methods and Apparatus for Range Matching During Packet Classification Based on a Linked-Node Structure;" U.S. patent application Ser. No. 12/242,278, filed on Sep. 30, 2008, and entitled "Methods and Apparatus to Implement Except Condition During Data Packet Classification;" U.S. patent application Ser. No. 12/242,168, filed on Sep. 30, 2008, and entitled "Methods and Apparatus Related to Packet Classification Associated with a Multi-Stage Switch;" U.S. patent application Ser. No. 12/242,154, filed on Sep. 30, 2008, and entitled "Methods and Apparatus Related to Packet Classification Based on Range Values;" U.S. patent application Ser. No. 12/242,158, filed on Sep. 30, 2008, and entitled "Methods and Apparatus for Producing a Hash Value based on a Hash Function;" and U.S. patent application Ser. No. 12/242,172, filed on Sep. 30, 2008, and entitled "Methods and Apparatus for Packet Classification Based on Policy Vectors;" all of which are incorporated herein by reference in their entireties.

After the data packet has been classified based on the primary conditions, an action descriptor associated with or related to a satisfied primary condition is determined, at 220. An action descriptor can define one or more actions to be executed by, for example, an access switch if the related condition is satisfied. The action descriptor is then interpreted, at 230. If the action descriptor requires or specifies packet classification using a secondary condition, the secondary condition is tested (or executed or performed), at 240. The result of testing the secondary condition is then checked or interpreted, at 250. If the secondary condition is not satisfied, an action is executed, at 270. For example, the action can be a default action such as a drop packet action or an action configured to forward a data packet without modifying any parameters of the data packet. In some embodiments, a condition can specify actions taken if the secondary condition is not satisfied and such an action can be executed, at 270. For example, an action descriptor can define an action that is executed if the secondary condition is satisfied by the data packet, and an action that is executed if the secondary condition is not satisfied by the data packet.

Returning to step 250, if the secondary condition is satisfied, an action is determined, at 260. For example, an action descriptor can define a first action to initiate classification using a secondary condition and a second action to be executed if the secondary condition is satisfied. Thus, at 260, the action descriptor can be accessed to interpret the second action. In some embodiments, the action descriptor can be cached while the secondary condition is tested, for example, at 240, and the cached action descriptor can be accessed, at 260. After the action is determined, at 260, the action is executed or processed, at 270.

Returning to step 230, if the action descriptor does not require or specify packet classification based on a secondary condition, an action defined by the action descriptor is executed, at 270. In some embodiments, as illustrated in FIG. 2, the action descriptor can be interpreted to determine the action, at 260. After an action is execute at step 270, process 200 can be repeated to process additional data packets and/or process a single data packet based on additional primary conditions.

In some embodiments, process 200 has additional or fewer steps than shown in FIG. 2. For example, in some embodiments, an action descriptor defines multiple actions. Thus, process 200 can repeat from step 230 to step 270 (as described above) multiple times to process each action defined by an action descriptor.

Figure 3:
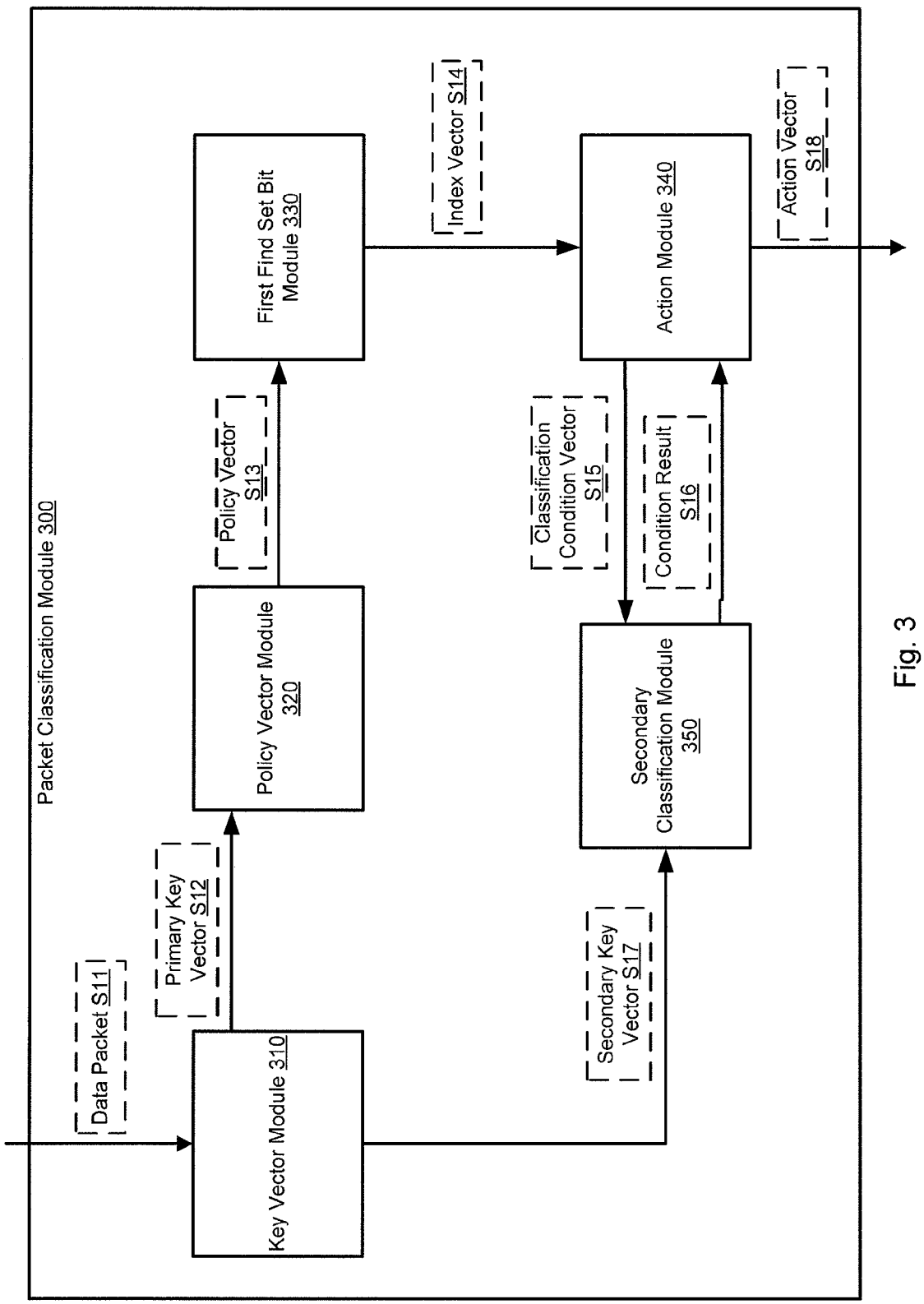
FIG. 3 is a system block diagram of a packet classification module, according to an embodiment.

FIG. 3 is a system block diagram of packet classification module 300, according to an embodiment. Packet classification module 300 is configured to classify data packets and provide action vectors or commands based on a policy. In some embodiments, a policy can include one or more policy conditions that are associated with action (or instructions)

that can be executed at the multi-stage switch fabric based on the outcome of evaluating the conditions. The policy can be, for example, a policy to route a data packet to a particular destination if the data packet has a specified type of network address (policy condition), or to alter a source address of the data packet if a particular condition is satisfied. Packet classification can include determining whether or not the policy condition has been satisfied so that the action can be executed. For example, a packet classification module can analyze (e.g., compare to a condition value defined in the policy) one or more portions (e.g., a field, a payload, an address portion, a port portion) of a data packet based on a policy condition defined within a policy. If the policy condition is satisfied, the data packet can be processed based on an action (or instruction related to an action) associated with the policy condition.

In some embodiments, packet classification module 300 is configured to classify data packet based on multiple conditions. As illustrated in FIG. 3, packet classification module 300 includes key vector module 310, policy vector module 320, first find set bit module 330, action module 340, and secondary classification module 350. As illustrated in FIG. 3, key vector module 310 is configured to receive data packet S11 and define primary key vector S12 and secondary key vector S17. Primary key vector S12 and secondary key vector S17 are key vectors configured to provide keys (or values) representing portions of a data packet for packet classification to other modules within packet classification module 300. FIG. 8 is an illustration of a key vector, according to an embodiment. As illustrated in FIG. 8, a key vector can include multiple keys (also referred to as condition values and/or key values). Referring now to FIG. 3, in some embodiments, one or more keys in primary key vector S12 represent a portion of data packet S11. For example, data packet S11 can include a destination port value such as, for example, a destination TCP port or a destination universal data packet ("UDP") port, and a key in primary key vector S12 can represent the destination port value. In some embodiments, a key can be a binary representation of a portion of data packet S11.

Key vector module 310 provides primary key vector S12 to policy vector module 320. Primary key vector S12 includes at least one key for use by policy vector module 320 to classify data packet S11 at policy vector module 320. In other words, key vector module 310 provides to policy vector module 320 one or more values representing portions of data packet S11 that will be used by policy vector module 320 to define policy vector S13. In some embodiments, policy vector S13 can be a bit vector having a combination of bit values representing satisfied conditions in a policy. Said differently, policy vector S13 can be a bit string defined by a combination of set (e.g., having a value of "1") bit values and unset (e.g., having a logic level of "0") bit values. The set bit values indicate that a primary condition in a policy is satisfied, and an action related to that condition can be triggered at action module 340 (after policy vector S13 has passed through first find set bit module 330).

In some embodiments, policy vector module 320 is configured to define policy vector S13 in response to packet classification using a longest prefix match or best-fit range match of, for example, one or more keys included in primary key vector S12 representing a source address of data packet S11, a destination address of data packet S11, a source port of data packet S11, and/or a destination port of data packet S11. U.S. patent application Ser. No. 12/242,143, filed on Sep. 30, 2008, and entitled "Methods and Apparatus for Compression in Packet Classification;" U.S. patent application Ser. No. 12/242,125, filed on Sep. 30, 2008, and entitled "Methods and Apparatus for Range Matching During Packet Classification Based on a Linked-Node Structure;" U.S. patent application Ser. No. 12/242,278, filed on Sep. 30, 2008, and entitled "Methods and Apparatus to Implement Except Condition During Data Packet Classification;" U.S. patent application Ser. No. 12/242,168, filed on Sep. 30, 2008, and entitled "Methods and Apparatus Related to Packet Classification Associated with a Multi-Stage Switch;" U.S. patent application Ser. No. 12/242,154, filed on Sep. 30, 2008, and entitled "Methods and Apparatus Related to Packet Classification Based on Range Values;" U.S. patent application Ser. No. 12/242,158, filed on Sep. 30, 2008, and entitled "Methods and Apparatus for Producing a Hash Value based on a Hash Function;" and U.S. patent application Ser. No. 12/242,172, filed on Sep. 30, 2008, and entitled "Methods and Apparatus for Packet Classification Based on Policy Vectors;" all of which are incorporated herein by reference in their entireties.

First find set bit module 330 is configured to receive policy vector S13 and define index vector S14 representing an action. In some embodiments, first find set bit module 330 can be referred to as an action index module. In some embodiments, index vector S14 defines a portion of a memory address of an action descriptor associated with (or triggered by), for example, a set bit value in policy vector S13. In other words, in some embodiments, an index vector S14 is produced or defined by first find set bit module 330 for each satisfied primary condition (e.g., set bit value in policy vector S13). In some embodiments, index vector S14 represents the position of the first set bit value in policy vector S14. In some embodiments, the position of bit values in policy vector S13 define a priority of the actions related to the conditions represented by the bit values. For example, the action related to the condition represented by the least significant bit value in policy vector S13 can have the highest priority in a policy, and the action related to the condition represented by the most significant bit value in policy vector S13 can have the lowest priority in a policy. In other embodiments, the priority can be reversed such that the action related to the condition represented by the least significant bit value in policy vector S13 can have the lowest priority in a policy, and the action related to the condition represented by the most significant bit value in policy vector S13 can have the highest priority in a policy. Thus, in some embodiments, first find set bit module 330 can operate as a prioritizing module and can define index vectors S14 in order of priority such that actions are executed by action module 340 in order of priority. In some embodiments, other priority schemes can be implemented. More details related to first find set bit modules (also referred to a first-find-set (FFS) modules) and index vectors are set forth in co-pending U.S. patent application Ser. No. 12/347,418, filed on Dec. 31, 2008, and entitled "Methods and Apparatus for Indexing Set Bit Values in a Long Vector Associated with a Switch Fabric," which is incorporated herein by reference in its entirety.

As illustrated in FIG. 3, index vector S14 can be provided to action module 340. Action module 340 is configured to receive index vector S14 and access an action descriptor triggered (or activated) by a satisfied primary condition. In some embodiments, action module 340 is configured to initiate additional or supplemental (also referred to as secondary) packet classification in response to an action included in an action descriptor accessed with index vector S14. For example, action module 340 can access an action descriptor at an address in a memory (not shown) accessible to action module 340 by adding a memory offset value to index vector S14. The action descriptor can define an action for supplemental classification of a data packet with secondary conditions. As illustrated in FIG. 3, action module 340 can provide classification condition vector S15 to secondary classification module 350. Secondary classification module 350 can interpret classification condition vector S15 and execute a secondary condition test to further classify a data packet based on classification condition vector S15.

In some embodiments, a secondary condition test can include determining whether a portion of data packet S11 included as a key in secondary key vector S17 satisfies a secondary condition defined by classification condition vector S15. In some embodiments, classification condition vector S15 can define a secondary condition test as a condition value and a condition relation. The secondary condition test is satisfied if a portion of data packet S11 and the condition value have or are related based on the condition relation. For example, the secondary classification vector S15 can define a secondary condition test as a condition value representing a TTL value and a greater-than condition relation, and secondary key vector S17 can include a key representing a TTL value in data packet S11. The condition value and the key from secondary key vector S17 satisfy the greater-than condition relation if the condition value is greater than the key from secondary key vector S17. Said differently, the secondary condition test is satisfied if the TTL value of the data packet is less than the condition value. In some embodiments, the condition value and key of secondary key vector S17 can be reversed as operands with respect to a condition relation. For example, in some embodiments a greater-than condition relation (or, in other words a secondary condition test having a greater-than condition relation) is satisfied if the condition value is greater than the key in secondary key vector S17, and in other embodiments a greater-than condition relation is satisfied if the key in secondary key vector S17 is greater than the condition value.

In some embodiments, a secondary condition test includes a key selector in addition to a condition value and a condition relation. For example, secondary key vector S17 can be a key vector having multiple keys similar to the key vector illustrated in FIG. 8. A key selector can indicate which key from secondary key vector S17 is used to determine whether the secondary condition test is satisfied. For example, a key selector can be an index value and secondary classification module 350 can select the key from secondary key vector S17 based on the key selector, and can determine whether that key and the condition value satisfy the condition relation.

After executing the secondary condition test, secondary classification module 350 can provide condition result S16 to action module 340. Action module 340 can receive condition result S16 and define action vector S18 in response to condition result S16. In some embodiments, condition result S16 is a signal or flag indicating whether a condition relation defined by classification condition vector S15 was satisfied by a condition value and key from secondary key vector S17. If the condition relation is satisfied, action module can define action vector S18 to cause some action relative to data packet S11. For example, an action descriptor accessed by action module 340 including a supplemental classification action can also include an action that is executed or effected by action module 340 if the secondary condition test defined by the supplemental classification action is satisfied.

In some embodiments, action vector S18 is provided to key vector module 310 or another module not shown in FIG. 3 that is configured to perform some action relative to data packet S11. In some embodiments, an action relative to data packet S11 can be changing or updating a portion or parameter of data packet S11. For example, a TTL value of data packet S11 can be increased or decreased, a destination or source address of data packet S11 can be changed, a destination or source port value of data packet S11 can be changed, a virtual local area network ("VLAN") tag of data packet S11 can be changed, flags such as TCP flags can be altered in data packet S11, and/or some other values or parameters of data packet S11 can be altered. In some embodiments, an action can include parsing data in a data packet into cells to be sent through a switch fabric. In some embodiments, action vector S18 can cause a database access or lookup to determine routing information associated with data packet S11. In some embodiments, one or more results of a database lookup can be used to alter parameters of data packet S11. For example, action vector S18 can indicate that data packet S11 includes particular characteristics (determined based on primary classification and secondary classification triggered or invoked by the primary classification of data packet S11), and a module such as, for example, a packet routing module (not shown) can access a database (not shown) to determine an appropriate destination address within a network for a data packet including those particular characteristics. The packet routing module can then set the destination address of data packet S11 to that destination address.

In some embodiments, two or more of key vector module 310, policy vector module 320, first find set bit module 330, action module 340, and secondary classification module 350 can be combined. For example, policy vector module 320 and first find set bit module 330 can be combined to operate as a single module. In other words, the functionality of two or more of these modules can be integrated into a single module.

In some embodiments, key vector module 310, policy vector module 320, first find set bit module 330, action module 340, and secondary classification module 350 are software modules or executable or other code executing at a processor. In other embodiments, key vector module 310, policy vector module 320, first find set bit module 330, action module 340, and secondary classification module 350 are hardware modules implemented or constructed on a single semiconductor chip. In some embodiments, key vector module 310, policy vector module 320, first find set bit module 330, action module 340, and secondary classification module 350 are implemented or constructed as hardware modules on separate or discrete semiconductor chips. In some embodiments, some of key vector module 310, policy vector module 320, first find set bit module 330, action module 340, and secondary classification module 350 are implemented as hardware modules on discrete semiconductor chips, and others of key vector module 310, policy vector module 320, first find set bit module 330, action module 340, and secondary classification module 350 are implemented as hardware modules on a single semiconductor chip. In some embodiments, some of key vector module 310, policy vector module 320, first find set bit module 330, action module 340, and secondary classification module 350 are implemented as software modules, and others of key vector module 310, policy vector module 320, first find set bit module 330, action module 340, and secondary classification module 350 are implemented as hardware modules.

In some embodiments, packet classification module 300 can include a controller or a clock (not shown). The controller or clock can provide timing and/or other control signals to one or more of key vector module 310, policy vector module 320, first find set bit module 330, action module 340, and secondary classification module 350 to provide flow control and/or coordination among key vector module 310, policy vector module 320, first find set bit module 330, action module 340, and secondary classification module 350. Additionally, in some embodiments packet classification module 300 can include multiple key vector modules, policy vector modules, first find set bit modules, action modules, and/or secondary classification modules. These modules can be configured to operate in parallel (e.g., substantially at the same time or simultaneously) one with another. For example, packet classification module 300 can include multiple first find set bit modules, and each first find set bit module provides index vectors to an action module.

Figure 4:
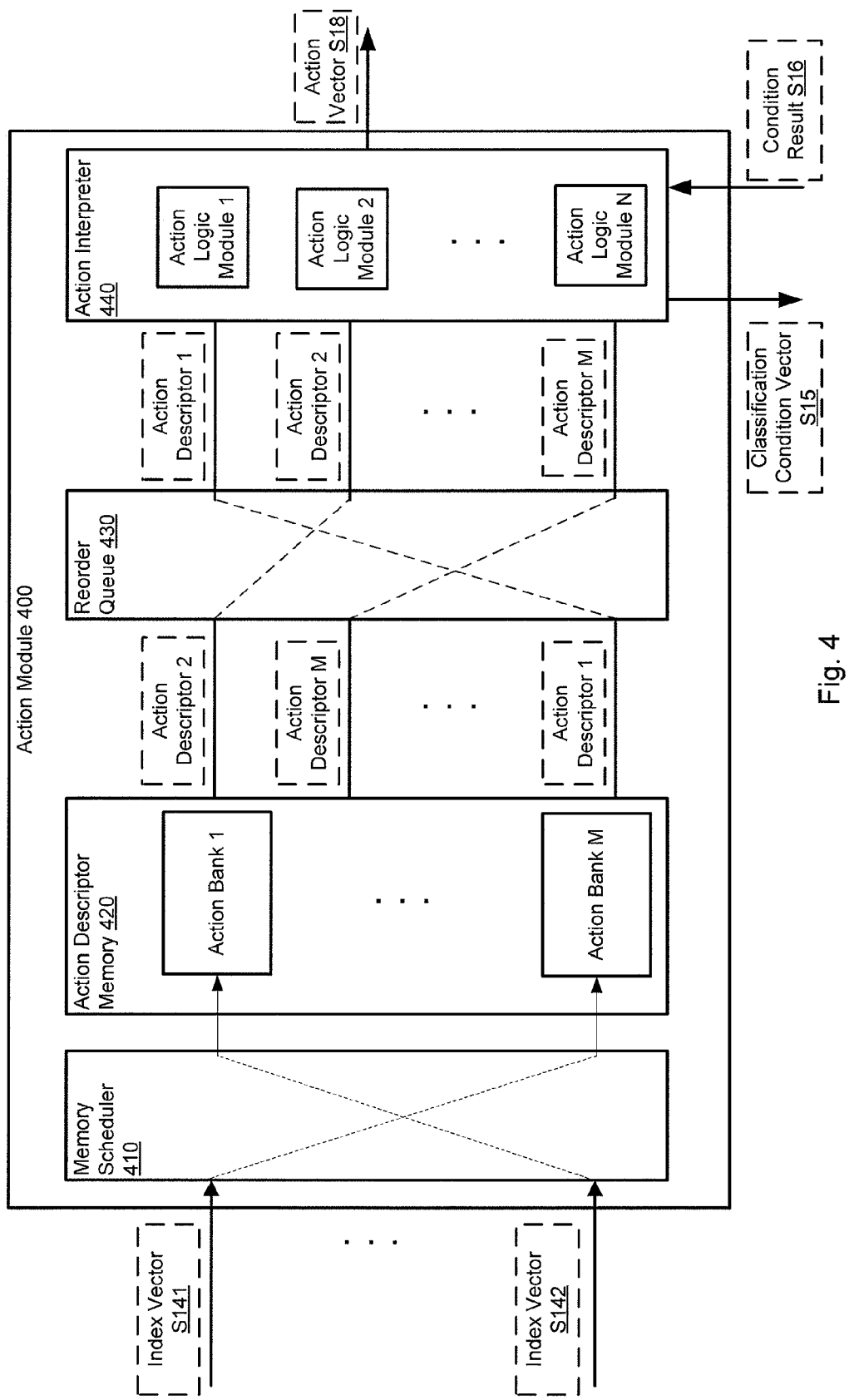
FIG. 4 is a system block diagram of an action module, according to an embodiment.

FIG. 4 is a system block diagram of an action module, according to an embodiment. Action module 400 includes memory scheduler 410, action description memory 420, reorder queue 430, and action interpreter 440. As illustrated in FIG. 4, action module 400 is configured to receive multiple index vectors such as index vector S141 and index vector S142 in parallel. As discussed above in relation to FIG. 3, index vectors S141 and S142 represent action descriptors (or the locations in memory of action descriptors) related to primary conditions satisfied by one or more keys in, for example, a primary key vector. Memory scheduler 410 is configured to receive index vector S141 and S142 and schedule each for access to a memory bank in action descriptor memory 420. In other words, memory schedule 410 can arrange incoming index vector for access to action descriptor memory 420. For example, in some embodiments, action descriptor memory 420 includes a single input, and memory scheduler 410 can place index vectors in a queue or other buffer. Memory scheduler 410 can sequentially address action descriptors in action descriptor memory 420 using the index vectors in the queue such that the action descriptors are provided to reorder queue 430.

Action descriptor memory 420 includes multiple memory banks. As illustrated in FIG. 4, action descriptor memory includes M memory banks. In some embodiments, each memory bank can be accessed (or addressed by an index vector) independent of the other memory banks in the action descriptor memory. In other words, M action descriptors (one in each memory bank) from action descriptor memory 420 can be accessed at a time. In some embodiments, action descriptors stored in action descriptor memory are 420 distributed across the multiple memory banks to increase the effective access rate of action descriptor memory 420. For example, for an action descriptor memory 420 in which all stored action descriptors are stored in a single memory bank, the effective access rate (or number of action descriptor accesses per unit of time such as a second) of the action descriptor memory 420 will be limited to the effective access rate of the single memory bank. However, if action descriptor memory 420 includes multiple memory banks, the effective access rate of action descriptor memory 420 is increased approximately by a multiple (equal to the number of memory banks) of the effective access rate of a single memory bank. For example, the effective access rate of an action descriptor memory 420 having three memory banks is approximately three times more than the effective access rate of an action descriptor memory 420 having a single memory bank.

Memory scheduler 410 receives and reorders index vectors (e.g., index vectors S141 and S142) before providing them to action descriptor memory 420 so that the index vectors are provided to the appropriate memory bank. For example, memory scheduler 410 can include a queue assigned to each memory bank in action descriptor memory 420. Thus, when memory scheduler 410 receives an index vector, it determines which memory bank in action memory descriptor memory 420 includes the action descriptor represented (or addressed) by that index vector, and then places that index vector in the queue assigned to or associated with that memory bank. For example, as illustrated in FIG. 4, index vector S141 addresses an action descriptor stored in memory bank M, and index vector S142 addresses an action descriptor stored in memory bank 1.

Memory scheduler 410 addresses action descriptors in the memory banks of action descriptor memory 420 such that the action descriptors addressed by the index vectors received at memory scheduler 410 are provided to reorder queue 430. For example, memory scheduler 410 adds an offset to an index vector and provides the sum to an input of a memory bank, and the action descriptor represented by that index value is output from action descriptor memory 420 to reorder queue 430. Reorder queue 430 reorders the action descriptors accessed in action descriptor memory 420 such that they are interpreted or executed by action interpreter in order of priority. As discussed above in relation to FIG. 3, in some embodiments actions (or the primary conditions that trigger actions) have a priority and are executed by action module 400 in order of priority.

Because action descriptor memory 420 includes multiple banks and memory scheduler 410 assigns index vectors to queues for accessing action descriptor memory 420, an action descriptor defining an action having a low priority can be accessed before an action descriptor defining an action having a higher priority. For example, multiple index vectors having high priorities and an index vector having a lower priority can be received by action module 400. If the index vectors having high priorities address action descriptors stored in a single memory bank, memory scheduler 410 assigns the multiple index vectors to the queue for that memory bank. Memory scheduler 410 processes the multiple index vectors (e.g., accesses action descriptors in action descriptor memory 410 with the index vectors) sequentially (or serially) until that queue is empty. If the index vector having a lower priority addresses an action descriptor stored in a different memory bank and is received before each of the index vectors having high priorities have been processed through the queue, the action descriptor addressed by the index vector having the lower priority could be accessed before one or more action descriptors having a higher priority. Reorder queue, thus, receives the action descriptors and reorders them such that the actions defined by the action descriptors are executed in order of priority.

In some embodiments, the action descriptors include a priority indicator that can be interpreted by reorder queue to reorder (or prioritize) the action descriptors. In some embodiments, memory scheduler 410 and action descriptor memory 420 provide signals representing the priority of action descriptors to reorder queue 430. For example, index vectors can include a priority indicator such as a priority field in the index vectors or the priority can be inherent (e.g., based on the address value of the index vector used to address an action descriptor), and memory scheduler 410 can provide the priority indicator to action descriptor memory 420. Action descriptor memory 420 can then provide the priority indicator to reorder queue 430 with each action descriptor. In some embodiments, memory scheduler 410 can be synchronized with action descriptor memory 420 and provide a priority indicator to reorder queue 430 when action descriptor memory 420 provides an action descriptor to reorder queue 430. For example, memory schedule 410, action descriptor memory 420, and reorder queue can receive control or timing signals (not shown) from a controller in a packet classification module (not shown).

Action interpreter 440 receives action descriptors from reorder queue 430 and interprets the actions defined by the action descriptors. As illustrated in FIG. 9, action descriptor can define multiple actions. For example, an action descriptor can define a first action and a second action. In some embodiments, one action can depend on another action. For example, a first action can define a secondary classification condition. If the secondary classification condition is satisfied, a second action in an action descriptor can be executed. If the secondary classification condition is not satisfied, a third action in an action descriptor can be executed.

In some embodiments, as illustrated in FIG. 4, an action interpreter 440 includes multiple action logic modules and can interpret two or more action descriptors in parallel (e.g., or substantially at the same time or simultaneously). In some embodiments, each action logic module independently interprets the action descriptors, and the actions defined by the action descriptors are executed in order of priority. In other words, after an action logic module determines an appropriate action in response to the action descriptor interpreted by that action logic module, action interpreter 440 executes that action. For example, action interpreter defines action vector S18 and provides action vector S18 to another module configured to process a data packet based on action vector S18. In other words, action vector S18 can provide an instruction or command to another module to realize the action defined in an action descriptor. In some embodiments, multiple action vectors S18 (e.g., one or more for each index vector received by action module 440) are defined or produced by action interpreter 440 of action module 400.

In some embodiments, action descriptors can be configured to define actions for secondary or supplemental classification. Thus, as illustrated in FIG. 4, action interpreter 440 can define and/or produce classification condition vector S15 and can receive condition result S16. As discussed above in relation to FIG. 3, if an action descriptor defines an action for secondary classification, action module 400 can provide (e.g., from action interpreter 440) classification condition vector S15 to a secondary classification module. The secondary classification module can classify a data packet (e.g., determine whether one or more secondary condition tests defined by classification condition vector S15 are satisfied) in response to classification condition vector S15 and provide condition result S16 to action module 400. Action interpreter can further process or interpret an action descriptor in response to condition result S16. For example, an action descriptor can define a first action for secondary classification and second and third actions that are executed based on the secondary classification. In some embodiments, a second action defined by an action descriptor can be executed if condition result S16 indicates that a condition test executed during secondary classification is satisfied by a data packet, and a third action descriptor can be executed if condition result S16 indicates that a condition test executed during secondary classification is not satisfied by that data packet.

Figure 5:
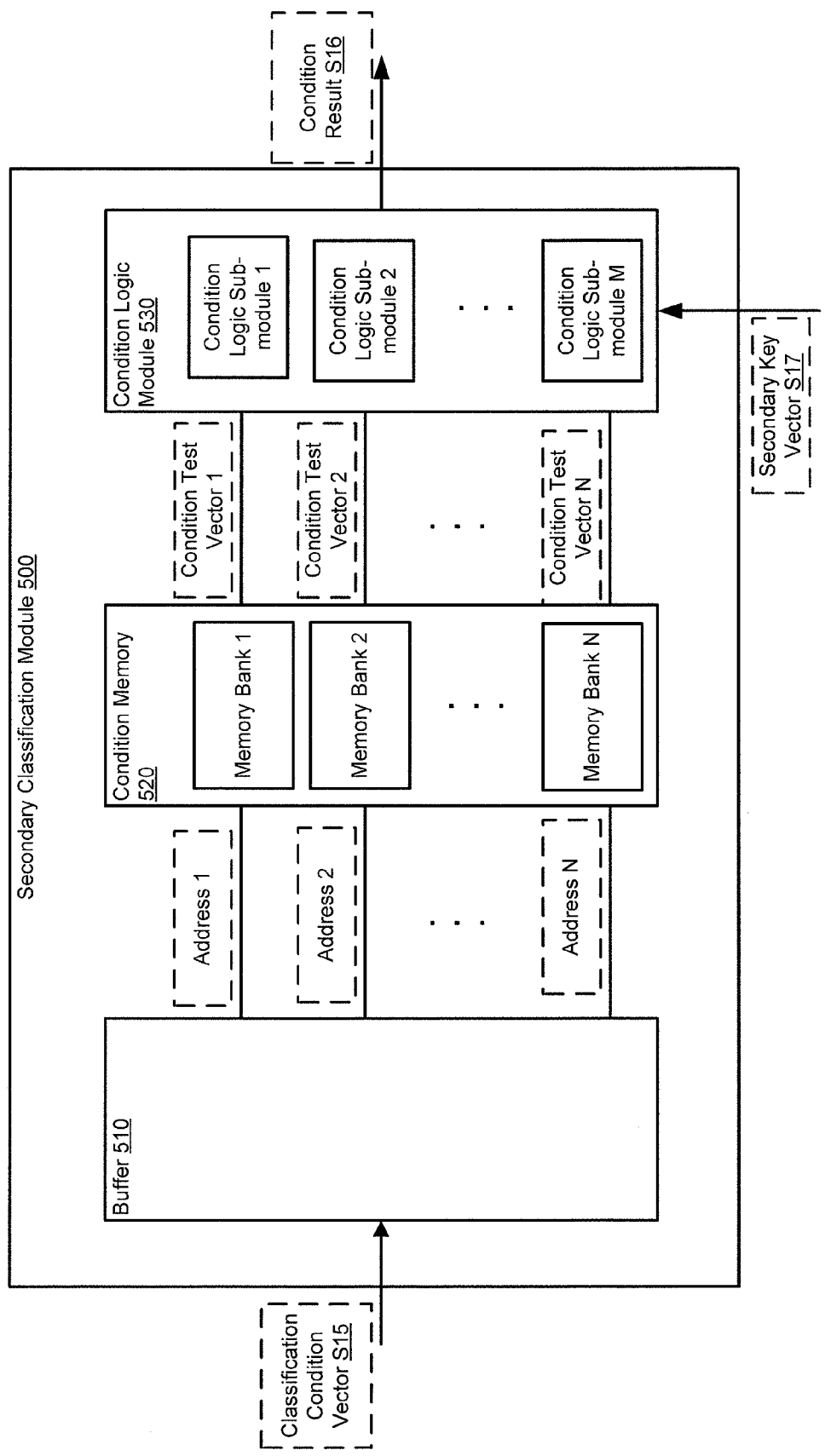
FIG. 5 is a system block diagram of a secondary classification module, according to an embodiment.

FIG. 5 is a system block diagram of a secondary classification module, according to an embodiment. Secondary classification module 500 includes buffer 510, condition memory 520, and condition logic module 530. Buffer 510 is configured to receive classification condition vector S15 and store classification condition vector S15 until it can be processed by the remaining portions of secondary classification module 500. For example, multiple action logic modules can provide classification condition vectors to secondary classification module 500. Buffer 510 can provide flow control for classification condition vectors provided to secondary classification module 500, and can marshal classification condition vectors such that they are processed in parallel by secondary classification module 500. In other words, buffer 510 can receive classification condition vectors, buffer the classification condition vectors, and provide addresses associated with the classification condition vectors to condition memory 520 at times when condition memory 520 can respond to the addresses. For example, in some embodiments classification condition vectors can be provided to secondary classification module 500 at a rate higher than the rate at which secondary classification module 500 can process the classification condition vectors. Buffer 510 can include a memory and temporarily store (or cache) the classification condition vectors. Buffer 510 can detect when condition memory 520 can receive an address (e.g., receive a signal from condition memory 520 indicating that processing for a previous address is complete), and access a classification condition vector in the memory. Buffer 510 can define an address based on the classification condition vector and provide the address to condition memory 520. In some embodiments, secondary classification module 500 includes a controller (or processor) (not shown) in communication with buffer 510 and condition memory 520, and configured to control buffer 510. For example, the controller (not shown) can provide signals to buffer 510 and can receive signals from condition memory 520 to determine when an address can be provided from buffer 510 to condition memory 520, and cause buffer 510 to provide an address to condition memory 520.

In some embodiments, buffer 510 can also translate classification condition vector S15 into an address for accessing a condition test vector defining a condition test for use during secondary classification in response to classification condition vector S15. In other words, buffer 510 can define a memory address associated with a memory location in condition memory 520 based on classification condition vector. In some embodiments, classification condition vector S15 is an index value that is added to a memory offset to define the memory address. In some embodiments, classification condition vector S15 includes an address for accessing a condition test vector. For example, the address of the condition test vector in condition memory 520 can be included in the action for secondary classification defined by an action descriptor interpreted by an action module. In other words, the action triggering or initiating secondary classification can include the address of the condition test to be executed during the secondary classification in classification condition vector S15. In other embodiments, buffer 510 can determine a memory address value by querying a database based on a value or combination of bit values included in classification condition vector S15. For example, a memory address value can be accessed from a table such as, for example, a lookup table with a value in classification condition vector S15.

Condition memory 520 is configured to store condition test vectors. As illustrated in FIG. 10, a condition test vector can include multiple condition tests. Also, as illustrated in FIG. 10, a condition test can include multiple portions or parameters. For example, a condition test vector can include a key selector, a relation selector, and a condition value. In some embodiments, secondary classification module 500 can use a key selector to select a key that is compared with a condition value based on a relation defined by a relation selector. In other words, a key selector can be used to select a key from a key vector to determine whether a relation (e.g., greater than, less than, equal to) defined by a relation selector exists between the key and the condition value. In some embodiments, a condition test vector is a bit vector and the parameters (e.g., key selector, relation selector, condition selector) of each condition test in the condition test vector are bit fields.

Referring now to FIG. 5, in some embodiments, condition memory 520 can include multiple memory banks (labeled "Memory Bank 1" through "Memory Bank N") similar to action descriptor memory 420 in FIG. 4, to improve performance of secondary classification module 500. Thus, in some embodiments, buffer 510 (or a scheduling module (not shown)) can determine which memory bank is addressed (or reference) by classification condition vector S15 and access the corresponding condition test vector in that memory bank.

Condition logic module 530 receives secondary key vector S17 from, for example, a key vector module as described in relation to FIG. 2. Secondary key vector S17 can include multiple keys representing various portions and/or parameters of a data packet that is the subject of secondary classification. In some embodiments, the parameters of a data packet that are included in secondary key vector S17 (and, thus, used during secondary classification) are mutually exclusive with parameters of that data packet used during primary classification. In some embodiments, parameters of a data packet used during primary classification can also be used during secondary classification. For example, in some embodiments the same parameters can be used during primary classification and secondary classification because more refined classification is processed during secondary classification.

In some embodiments, as illustrated in FIG. 5, condition test vectors can be processed in parallel. For example, condition logic module 530 can include multiple condition logic sub-modules (labeled "Condition Logic Sub-module 1" through "Condition Sub-module M"), each configured to interpret condition tests in a condition test vector. Each condition logic sub-module receives a condition test vector and can access secondary key vector S17 received by condition logic module 530. Each condition logic sub-module executes the one or more condition tests included in the condition test vector, and provides the result of the condition test or secondary classification to the action module that provided the classification condition vector S15 referencing that condition test vector. The result of the secondary classification is provided in condition result S16. Condition result S16 can be a signal such as, for example, a high or low binary value. In some embodiments, condition result can be a vector including multiple bit values such as, for example, a bit field indicating the results of the secondary classification (e.g., an binary classification value) and a bit field containing an address or identifier or the action module that provided the classification condition vector requesting (or initiating) the secondary classification.

Figure 6:
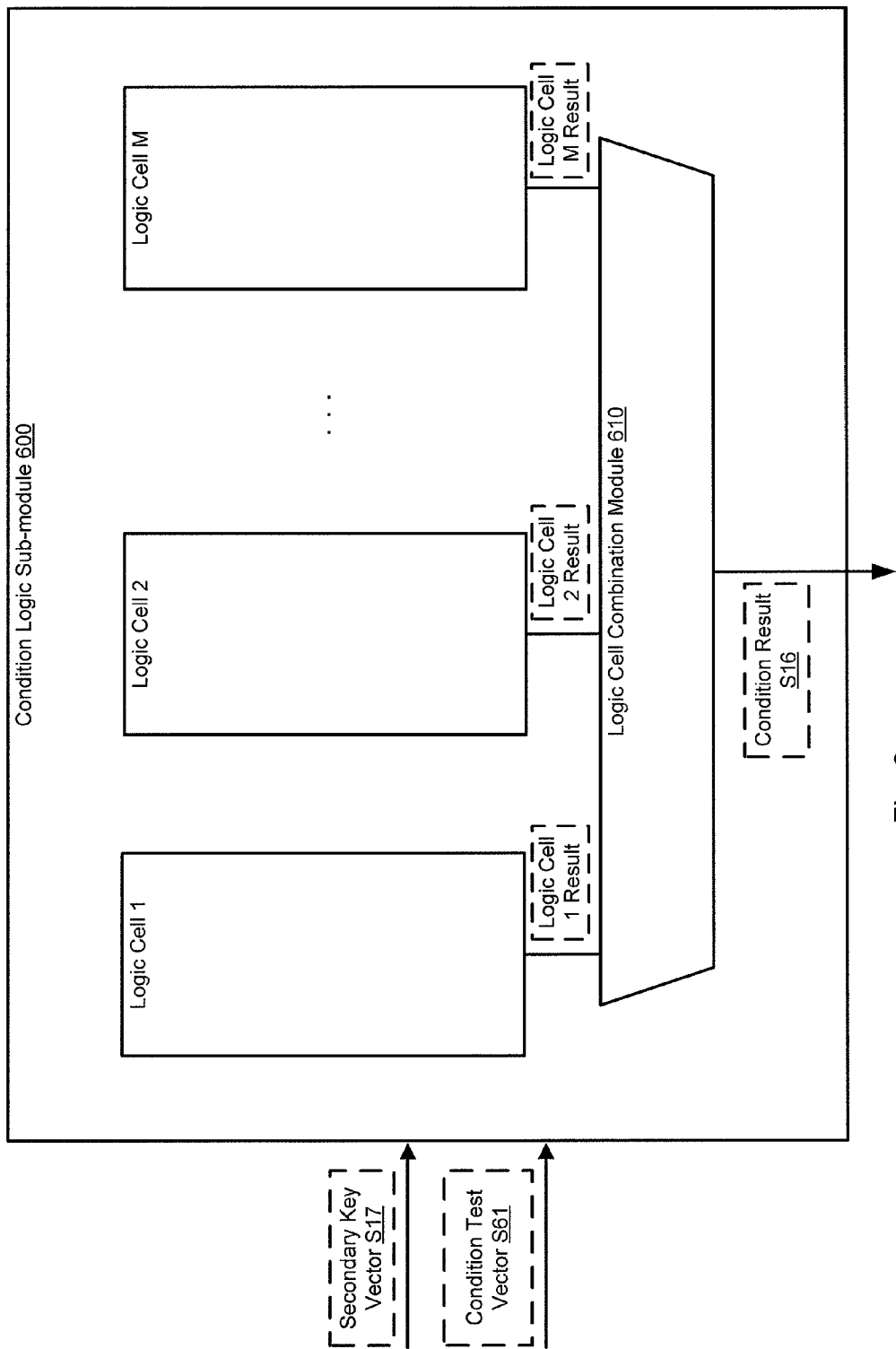
FIG. 6 is a system block diagram of a condition logic sub-module, according to an embodiment.

FIG. 6 is a system block diagram of a condition logic sub-module, according to an embodiment. Condition logic 600 includes multiple logic cells (labeled "Logic Cell 1" through "Logic Cell M"). Each logic cell receives a condition test from condition test vector S61 and processes that condition test such that each condition test in condition test vector S61 is processed in parallel. Additionally, each logic cell can access the keys in secondary key vector S17 and compare one or more keys with a condition value in the condition test processed by that logic cell.

As illustrated in FIG. 6, logic cell combination module 610 is operatively coupled to each logic cell in condition logic sub-module 600. Logic cell combination module 610 receives from each logic cell a logic cell result (labeled "Logic Cell 1 Result" through "Logic Cell M Result). A logic cell result provides an indication of the result or outcome of the condition test processed by a logic cell. For example, a logic cell result can have a binary value indicating that a condition relation of a condition test is satisfied by a key from secondary key vector S17 and a condition value of a condition test. Logic cell combination module 610 combines the logic cell result of each logic cell and defines condition result S16.

In some embodiments, logic cell combination module 610 includes binary combination logic. In some embodiments, logic cell combination module 610 can perform a logical AND function with each logic cell result and condition result S16 can indicate that each condition test is satisfied. In some embodiments, logic cell combination module 610 can perform a logical XOR function with each logic cell result and condition result S16 can indicate that only one condition test is satisfied. In some embodiments, logic cell combination module 610 can perform an OR, NAND, or some other logic function or a combination of logical functions. In some embodiments, logic cell combination module 610 can determine the result of each logic cell and provide each result in condition result S16. For example, condition result S16 can indicate the number of condition tests performed and the result (e.g., satisfied or not satisfied) of each condition test.

In some embodiments, condition test vector S61 includes multiple condition tests, as illustrated in FIG. 10. In some embodiments, a condition test from condition test vector S61 is provided to each logic cell in condition logic sub-module 600. For example, each logic cell can include a multiplexer (not shown) and a condition test from condition test vector S61 is provided to each logic cell. Thus, each condition test in condition test vector S61 can be executed or processed in parallel. In other embodiments, condition logic sub-module 600 includes fewer logic cells than the number of condition tests in condition test vector, and the logic cells can process more than one condition test in condition test vector S61. For example, condition logic sub-module 600 can include a clock signal, processor, or controller configured to provide a first condition test to a logic cell, and a second condition test to that logic cell after that cell has produced a first logic cell result.

In some embodiments, logic cell combination module 610 can be configurable. For example, condition test vector S61 can include a condition test that defines a logic cell combination configuration selector field (not shown in FIG. 10). For example, a combination of bit values in the logic cell combination configuration selector field can be extracted from the condition test vector S61 and provided to logic cell combination module 610. Logic cell combination module 610 can perform logic functions or combinations of logic functions based on the bit value.

Figure 7:
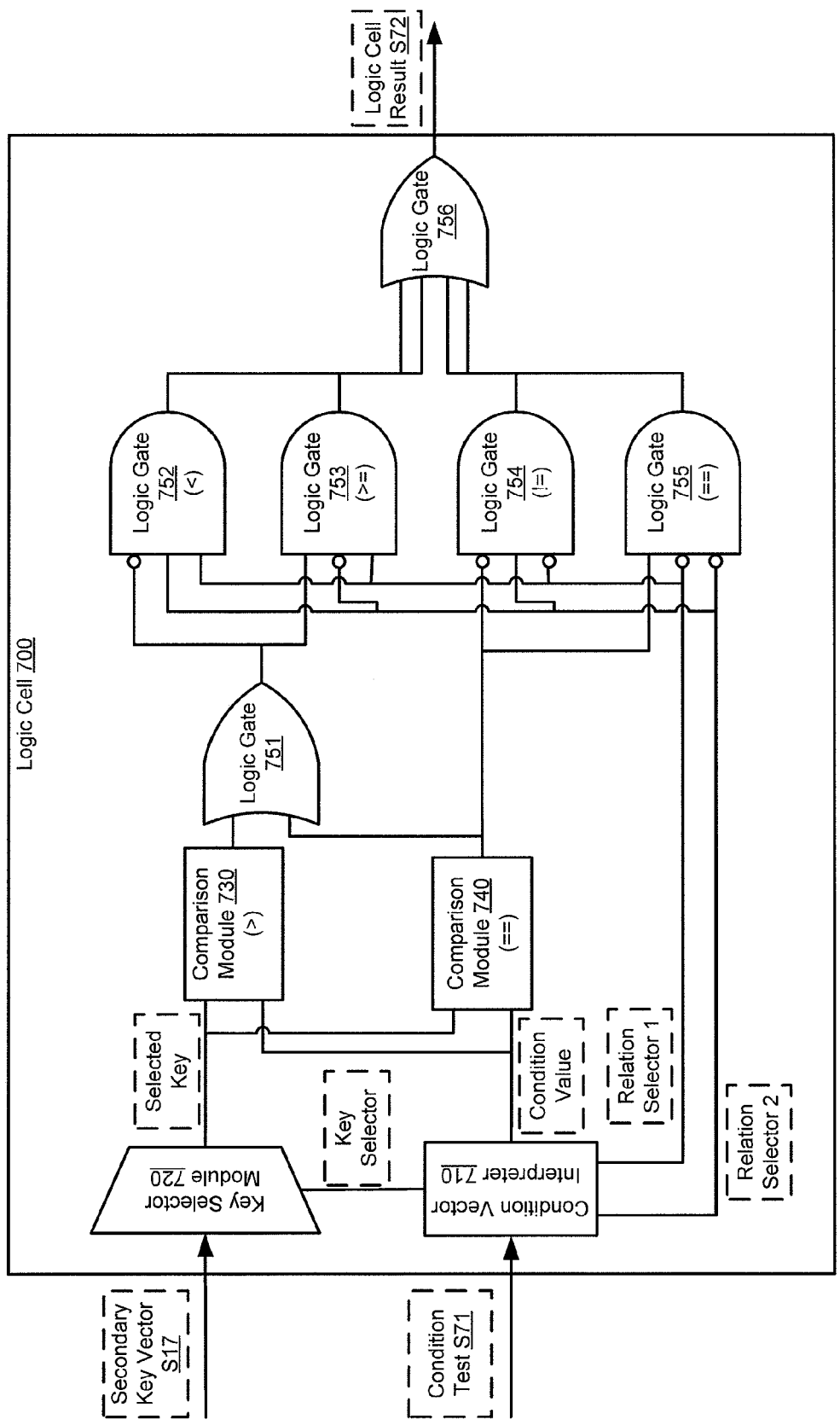
FIG. 7 is a system block diagram of a logic cell, according to an embodiment.

FIG. 7 is a system block diagram of a logic cell, according to an embodiment. As illustrated in FIG. 7, logic cell 700 includes key selector module 720, condition test interpreter 710, comparison modules 730 and 740, and logic gates 751-756. As described in relation to FIG. 6, logic cell 700 is configured to receive condition test S71 and secondary key vector S17 and define or produce logic cell result S72. Condition test S71 can be, for example, one of a group of condition tests included in a condition test vector such as, for example, condition test vector S61 in FIG. 6. As illustrated in FIG. 10 and discussed above, a condition test S71 can include multiple parameters including a key selector, a relation selector, and a condition value. In some embodiments, as illustrated in FIG. 7, logic cell defines logic cell result S72 based on a configurable comparison or relation of a key and a condition value. The symbols in parenthesis on logic gates 752-755 describe the logical functions available in logic cell 700. Logic cell 700 can indicate (via logic cell result S72) whether a key and a condition value satisfy one of the following relations: the key is less than the condition value, the key is greater than or equal to the condition value, the key is not equal to the condition value, and the key is equal to the condition value. In some embodiments, other logical functions can be implemented in logic cell 700. For example, logic cell 700 can indicate whether a key is greater than a condition value, whether a key is less than or equal to a condition value, and/or other logical functions or combinations of logic functions.

Condition test interpreter 710 receives condition test S71 and provides the parameters of condition test S71 to other modules in logic cell 700. The key selector included in condition test S71 is provided to key selector module 720. Key selector module 720 receives (or accesses) secondary key vector S17, and selects a key from secondary key vector S17 based on the key selector provided by condition test interpreter 710. In other words, a key selector can be an index and key selector module can access the key in secondary key vector S17 based on that index.

Key selector module 720 provides the selected key to comparison module 730 and comparison module 740. Condition test interpreter 710 provides the condition value from condition test S71 to comparison module 730 and comparison module 740. Comparison module 730 compares the selected key and the condition value, and indicates to logic gate 751 whether the selected key has a value greater than the condition value. Similarly, comparison module 740 compares the selected key and the condition value, and indicates to logic gates 751, 754 and 755 whether the selected key has a value equal to the condition value. Logic gate 751 provides the result of a logical OR function of the output of comparison module 730 and comparison module 740 to logic gates 752 and 753. Logic gates 752-755 interpret these outputs or signals in combination with relation selector 1 and relation selector 2 defined by condition test interpreter 710 based on a relation selector parameter in condition test S71. For example, as illustrated in FIG. 7, the relation selector parameter in condition test S71 defines a two-bit vector (relation selector 1 is the least significant bit of the bit vector, and relation selector 2 is the most significant bit of the bit vector) that selects which logical function (or relation) is tested by logic cell 700.

More specifically, as shown in FIG. 7, a "less-than" relation is tested by logic cell 700 if relation selector 1 has a set bit value (e.g., bit value of "1" for positive logic or bit value of "0" for negative logic) and relation selector 2 has a set bit value. A "greater-than" or "equal-to" relation is tested by logic cell 700 if relation selector 1 has a set bit value and relation selector 2 has an unset (or reset) set bit value (e.g., bit value of "0" for positive logic or bit value of "1" for negative logic). A not-equal to relation is tested by logic cell 700 if relation selector 1 has an unset bit value and relation selector 2 has a set bit value. An equal-to relation is tested by logic cell 700 if relation selector 1 has an unset bit value and relation selector 2 has an unset bit value.

As illustrated in FIG. 7, logic cell 700 is implemented using stateless logic. In other words, in some embodiments logic cell 700 does not include (or is independent from) control or timing circuitry or elements. Thus, logic cell result S72 is defined after inputs provided to logic cell 700 propagate through the elements (e.g., module and logic gates) of logic cell 700 delayed only by signal propagation delays through each element.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments, features of one module described herein can be included in another module to reduce the number of discrete components of an apparatus. Additionally, in some embodiments, for example, some modules described herein can be implemented in software or code executing on a processor and other modules can be implemented in hardware such as application-specific integrated circuits or semiconductor chips.

What is claimed is:

1. A method executed by a processor, comprising:
defining a policy vector during packet classification of a data packet based on a primary key vector associated with a first portion of the data packet, the policy vector including a combination of bit values associated with a primary classification condition satisfied by the primary key vector;
accessing an action descriptor defining a first action and a second action, the action descriptor associated with a set bit value within the policy vector, the first action defining a secondary classification condition; and
executing the second action if the secondary classification condition is satisfied by a secondary key vector associated with a second portion of the data packet.

2. The method of claim 1, wherein:
the secondary classification condition is a first secondary classification condition; and
the second action defines a second secondary classification condition.

3. The method of claim 1, further comprising determining whether the secondary classification condition is satisfied by the secondary key vector based on a logical combination of a bit vector representing a condition value associated with the secondary classification condition and the secondary key vector.

4. The method of claim 1, further comprising:
defining an index vector associated with a position of the set bit value within the policy vector,
the action descriptor being stored in a memory having a memory address, and the accessing including selecting the memory address with the index value.

5. The method of claim 1, wherein the primary classification condition is based on an internet protocol address and the secondary classification condition is based on a medium access control address.

6. The method of claim 1, wherein the executing includes at least one of altering a portion of the data packet, updating a count value, or dropping the data packet.

7. An apparatus implemented in at least one of a non-transitory processor-readable medium or a processing device, comprising:
 a policy vector module to define a policy vector in response to a primary classification condition satisfied by a first portion of a data packet received at an access switch operatively coupled to a switch fabric, the policy vector including a set bit value representing an action at the access switch;
 an action module to access an action descriptor associated with the action represented by the set bit value in the policy vector, the action module to produce a secondary classification command included in the action descriptor; and
 a secondary classification condition module operatively coupled to the action module and to receive the secondary classification command, the secondary classification condition module to provide to the action module an indicator that a secondary classification condition is satisfied by a second portion of the data packet.

8. The apparatus of claim 7, further comprising:
 an action index module to define an index value associated with the action represented by the set bit value in the policy vector,
 the action module is to access the action descriptor based on the index value.

9. The apparatus of claim 7, wherein the action module is to effect at least one of altering a portion of the data packet, updating a count value, or dropping the data packet at the access switch.

10. The apparatus of claim 7, further comprising a key vector module operatively coupled to the policy vector module and the secondary classification condition module, the key vector module to provide to the policy vector module a primary key vector associated with the first portion of the data packet, the key vector module to provide to the secondary classification condition module a secondary key vector associated with the second portion of the data packet.

11. The apparatus of claim 7, wherein the policy vector module includes a hardware-based hash function and a memory configured as a linked node structure.

12. The apparatus of claim 7, wherein:
 the action is a first action; and
 the action module is to define an action vector in response to the indicator provided by the secondary classification condition module, the action vector being based on a second action included in the action descriptor.

* * * * *